United States Patent
Tyrer

(10) Patent No.: US 9,045,022 B2
(45) Date of Patent: Jun. 2, 2015

(54) GOLF CART ENCLOSURE AND SYSTEM AND METHOD OF ATTACHING ENCLOSURE TO GOLF CART

(71) Applicant: Stephen Tyrer, Deer Park, NY (US)

(72) Inventor: Stephen Tyrer, Deer Park, NY (US)

(73) Assignee: Stephen Tyrer, Deer Park, NY (US)

( * ) Notice: Subject to any disclaimer, the term of this patent is extended or adjusted under 35 U.S.C. 154(b) by 0 days.

(21) Appl. No.: 14/163,187

(22) Filed: Jan. 24, 2014

(65) Prior Publication Data

US 2014/0203588 A1 Jul. 24, 2014

Related U.S. Application Data

(60) Provisional application No. 61/756,179, filed on Jan. 24, 2013.

(51) Int. Cl.
| | |
|---|---|
| *B60J 1/06* | (2006.01) |
| *B60J 1/12* | (2006.01) |
| *B60J 5/04* | (2006.01) |
| *B60J 1/00* | (2006.01) |
| *B60J 1/10* | (2006.01) |

(52) U.S. Cl.
CPC ............ *B60J 1/006* (2013.01); *Y10T 29/49876* (2015.01); *B60J 5/0487* (2013.01); *B60J 1/06* (2013.01); *B60J 1/10* (2013.01)

(58) Field of Classification Search
CPC ............ B60J 1/004; B60J 1/006; B60J 1/007; B60J 1/025; B60J 1/085; B60J 1/10; B60J 1/12; B60J 1/2011; B60J 5/045; B60J 5/0486; B60J 5/0487; B60J 5/12; B60J 5/125; B60J 11/06; A47H 1/18

USPC ............ 296/190.01, 190.03, 193.04, 190.08, 296/190.1, 190.11, 77.1, 78.1, 84.1, 102, 296/146.1, 146.9, 135, 96.21, 147

See application file for complete search history.

(56) References Cited

U.S. PATENT DOCUMENTS

| | | | |
|---|---|---|---|
| 4,621,859 A | 11/1986 | Spicher | |
| 5,192,109 A * | 3/1993 | Roberts | 296/84.1 |
| 5,367,977 A * | 11/1994 | Ellis et al. | 114/361 |
| 5,385,379 A * | 1/1995 | Heavner | 296/84.1 |
| 5,791,720 A * | 8/1998 | Moore et al. | 296/96.2 |
| 5,954,385 A * | 9/1999 | Moore et al. | 296/96.2 |
| 5,975,615 A * | 11/1999 | Showalter | 296/96.21 |
| 5,979,968 A * | 11/1999 | Essig et al. | 296/102 |
| 6,206,447 B1 * | 3/2001 | Nation | 296/77.1 |
| 6,241,305 B1 * | 6/2001 | Troeger et al. | 296/102 |
| 6,286,888 B1 * | 9/2001 | Essig | 296/102 |
| 6,439,637 B1 | 8/2002 | Tyrer | |
| RE38,272 E | 10/2003 | Nation | |
| 6,663,158 B1 * | 12/2003 | Showalter | 296/96.21 |
| 7,267,388 B2 * | 9/2007 | Hanson et al. | 296/77.1 |
| 7,354,092 B2 * | 4/2008 | Showalter et al. | 296/77.1 |
| 7,448,666 B2 | 11/2008 | Tyrer | |
| 7,452,023 B2 * | 11/2008 | Hanson et al. | 296/96.2 |
| 8,087,711 B1 * | 1/2012 | Mauro | 296/89 |

(Continued)

*Primary Examiner* — Gregory Blankenship

(74) *Attorney, Agent, or Firm* — Hoffmann & Baron, LLP

(57) ABSTRACT

A system and method for attaching an enclosure to a golf cart includes a flange member extending outwardly from a golf cart and a mounting strip having a tab portion attached to a golf cart enclosure panel. The mounting strip also includes a body portion having a u-shaped channel which is dimensioned and adapted to be press-fit onto an outer edge of the flange member thereby securing the enclosure panel to the golf cart.

20 Claims, 3 Drawing Sheets

(56) References Cited

U.S. PATENT DOCUMENTS

2006/0290163 A1* 12/2006 Showalter et al. ............ 296/102
2012/0311825 A1 12/2012 Schneider
2014/0203588 A1* 7/2014 Tyrer ............................. 296/79

* cited by examiner

GOLF CART ENCLOSURE AND SYSTEM AND METHOD OF ATTACHING ENCLOSURE TO GOLF CART

This application claims priority to U.S. Provisional Application Ser. No. 61/756,179 filed on Jan. 24, 2013, the disclosure of which is incorporated herein by reference in its entirety.

FIELD OF THE INVENTION

This invention relates to an enclosure for golf carts. More particularly, this invention relates to a system and method for attaching a removable enclosure to a golf cart.

BACKGROUND OF THE INVENTION

Typically, golf carts include a roof structure to protect the occupants from the elements, but the front, back and sides are generally open. Currently, various types of golf cart enclosures are designed to be mounted on a golf cart to cover the exposed areas to protect occupants against rain, wind and other inclement weather. One type of enclosure is known in the industry as a soft enclosure since it is made primarily of fabric and flexible transparent windows. Examples of soft enclosures are shown in U.S. Pat. Nos. 6,439,637 and 7,448,666. Another type of enclosure is known as a hard enclosure since it is made to include a rigid frame covered primarily in fabric and flexible transparent materials to provide windows for the passengers to look out.

Oftentimes, the golf carts of various manufacturers have different body styles and shapes. Thus it is difficult to design enclosures which are universally adapted to fit all makes and models of golf carts. All golf carts generally include a roof and four support members which extend upwards to attach to the bottom of the roof. Thus, it would be beneficial to design an enclosure mounting system which can be mounted to a variety of locations on the golf cart including the roof support members.

SUMMARY OF THE INVENTION

The primary object of the present invention is to provide a system and method for easily mounting a golf cart enclosure to various parts of a golf cart.

It is a further object of the present invention to provide a golf cart enclosure mounting system which has a neat appearance and is easy to install without modifications to the golf cart.

It is still a further object of the invention to provide a golf cart enclosure mounting system which can be attached to all types of golf carts which include roof support members.

Another object of the present invention is to provide a system and method for mounting an enclosure to a golf cart that reduces the labor and costs associated with installation and removal of the enclosure.

The present invention fulfills the above and further objects by providing a golf cart enclosure mounting system having an elongated flange member extending outwardly from the golf cart and a mounting strip having a tab portion attached to a golf cart enclosure panel, the mounting strip further including a u-shaped channel dimensioned to be press-fit onto an outer edge of the elongate flange member. The elongated flange member is preferably part of a bracket mounted to the golf cart. Alternately, the bracket having the elongate flange may be a part of a frame structure to which fabric is mounted to form the enclosure which, in turn, is mounted to the golf cart.

In a preferred embodiment, the bracket includes a u-shaped opening defined by a base and two legs extending upwardly from the base. The u-shaped portion of the bracket is adapted to be mounted onto the golf cart roof support member, which typically includes a generally square outer profile. The bracket may also include a windshield receiving channel which is positioned perpendicular to the u-shaped roof support opening. The flange member preferably extends outwardly from either a leg or base of the bracket. For example, the flange member may extend outwardly from a distal end of either leg of the bracket in a direction away from the base. Alternatively, the flange may extend from a proximal end of the leg where it connects to the base in a direction rearwardly beyond the base of the bracket.

To assist the mounting strip in gripping onto the flange, the flange member may include mounting strip retention members on one or both surfaces thereof. The mounting strip retention members may include one or more grooves, ridges, fingers, tabs, projections and slots.

The mounting strip includes a body portion having a u-shaped channel adapted to be mounted onto an outer edge of the flange member. The mounting strip further includes a tab portion which extends from the body portion and has a sufficient width to allow the mounting strip to be attached to a golf cart enclosure panel. The tab portion is attached to the golf cart enclosure panel by any means known to those skilled in the art, including but not limited to sewing, bonding by adhesives, stapling, ultrasonically welding, thermo forming and/or the like. The mounting strip u-shaped channel may also include retention members on the inner surfaces thereof to assist in holding the mounting strip onto the flange member. The mounting strip may also include a shape retention member provided in the body portion to keep the shape of the body in close contact with the flange member during repeated installations and removal of the golf cart enclosure. The shape retention member preferably includes a substantially u-spared metal member embedded in the body portion of the mounting strip.

The present invention also includes a method of mounting a golf cart enclosure to a golf cart including the steps of providing an outwardly extending flange member on a golf cart, attaching a tab portion of a mounting strip to a golf cart enclosure panel, the mounting strip further including a body portion having a u-shaped channel, and press-fitting the u-shaped channel of the mounting strip onto an outer edge of the flange member thereby attaching the enclosure panel to the golf cart. The method further includes providing the flange member as part of a bracket which can be mounted to the golf cart, the flange member extending outwardly from the bracket. Alternatively, the flange member may be part of a bracket mounted to a golf care enclosure frame, the golf cart enclosure frame being mounted to the golf cart.

The above and other objects features and advantages of the present invention will be more readily apparent to those skilled in the art upon reading of the following detailed description in conjunction with the drawings wherein there is shown and described illustrative embodiments of the invention.

BRIEF DESCRIPTION OF THE DRAWINGS

For a further understanding of the nature and objects of the invention, reference should be made to the following detailed description taken in connection with the accompanying drawings in which.

DETAILED DESCRIPTION

Figure 1:
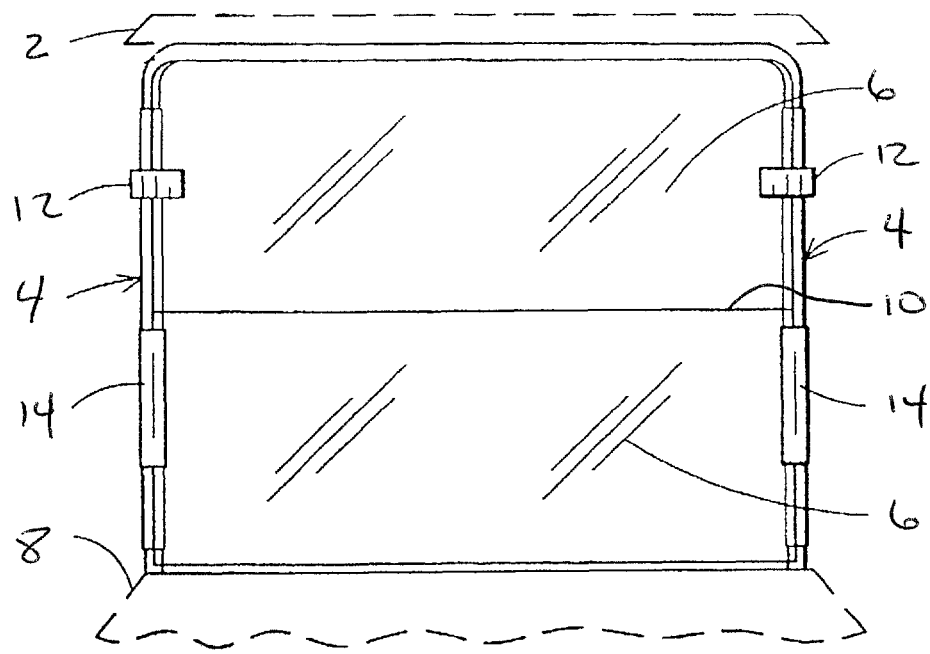
FIG. 1 is a front view of the roof support and windshield mounted thereto with the bracket of the present invention mounted to each of the front roof support members.

Referring to FIG. 1, the system and method for mounting a golf cart enclosure to a golf cart is illustrated. Specifically, FIG. 1 illustrates a front view of a typical golf cart illustrating the roof 2, roof support members 4, windshield 6, and golf cart front body 8. The windshield 6 includes a fixed lower section and an upper movable section which can be moved between a closed position (as shown in FIG. 1) to an open position. The windshield is provided with a hinge 10 which allows the upper section to pivot downward over the fixed lower section. Rubber holders 12 retain the windshield in the closed position. The fixed lower section is held in place by a bracket 14 mounted to the front roof support members 4.

Figure 2:
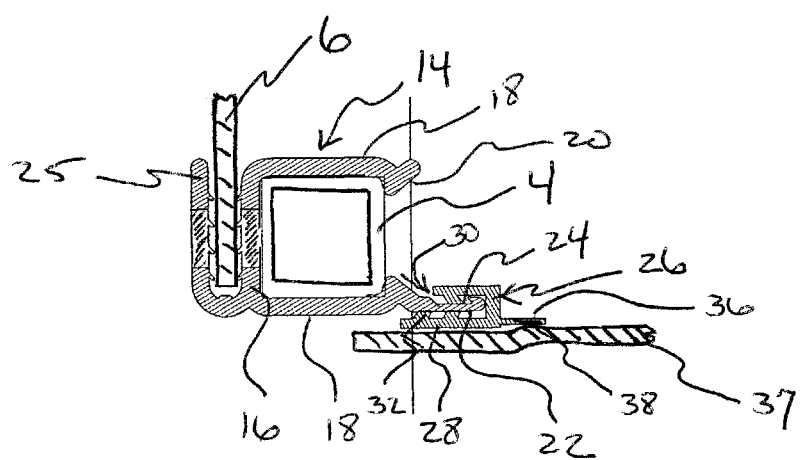
FIG. 2 is a top cross-sectional view of one embodiment through the bracket shown in FIG. 1.
Figure 3:
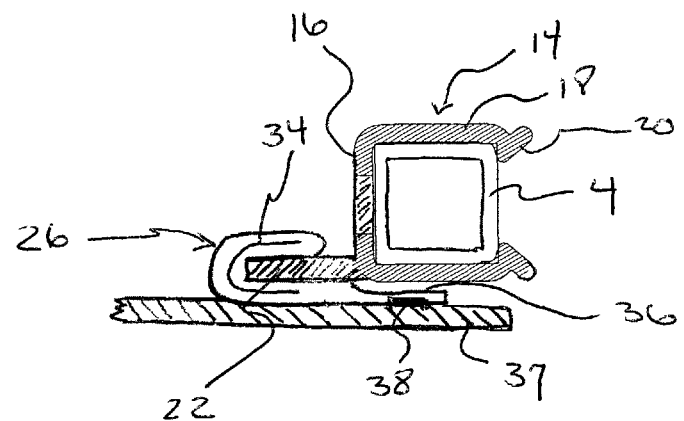
FIG. 3 is a top cross-sectional view of another embodiment through the bracket shown in FIG. 1.

In the present invention, the brackets typically used to hold the lower section of the windshield have been replaced with brackets 14 formed in accordance with the invention which include an outwardly extending flange member (see FIGS. 2 and 3). The brackets 14 of the present invention provide an attachment point for securing an enclosure to the golf cart which covers the sides and back of the cart to protect the occupants from the elements.

FIG. 2 is a top cross-sectional view of the bracket 14 shown in FIG. 1. The bracket 14 includes a base 16 and two upstanding legs 18 to form a u-shaped opening. The u-shaped opening is dimensioned to be press-fit onto a roof support member 4. Each leg 18 further includes a sloped end member 20 to assist in guiding the bracket onto the roof support member and holding it in place. One leg 18 further includes an elongated flange member 22 extending outwardly from a distal end thereof. The flange member may include a mounting strip retention members 24 on one or both of the outer surfaces. The mounting strip retention members 24 may be in the form of one or more grooves, ridges, fingers, tabs, projections and slots.

As shown in FIG. 2, the bracket 14 further includes a u-shaped channel dimensioned to receive the windshield 16. The u-shaped windshield channel 25 has its opening perpendicular to the u-shaped opening adapted to receive the roof support member 4. The u-shaped windshield channel may include retention members 24 on the inner surfaces of the channel to firmly hold the windshield in place.

As shown in FIG. 2, the system for attaching an enclosure to a golf cart further includes a mounting strip 26. The mounting strip 26 includes a body portion 28 having a u-shaped channel 30 dimensioned and adapted to be press-fit onto an outer edge of the elongate flange member 22. The mounting strip may also include retention members 32 on an inner surface thereof to enhance the grip on the flange member. The retention members 32 may take any form as discussed above with respect to the flange member. In one embodiment, the retention members 32 on the mounting strip include angled fingers which allow easy insertion onto the flange member but resist movement in the direction of removal. The mounting strip preferably also includes a shape retention member 34 (see FIG. 3) to maintain the distance between the legs of the u-shaped channel. The shape retention 34 member may include a u-shaped metal insert or other rigid material embedded along the length of the body portion of mounting strip 26. As shown in FIG. 2, both the flange member 22 and the mounting strip body include retention members 24. Specifically, the flange member 22 includes a retention member 32 in the form of a slot which is adapted to receive an angled projection or finger on the inner surface of the u-shaped channel of the mounting strip 26 body portion to prevent unwanted removal of the mounting strip from the flange member.

The mounting strip 26 further includes a tab portion 36 which extends from the body portion. The tab portion has a width sufficient to allow an enclosure panel to be secured thereto. For example, the enclosure panel 37 may be affixed to the enclosure panel by sewing, bonding by adhesives, stapling, ultrasonically welding, thermoforming and/or the like.

An alternative embodiment of the present invention is illustrated in FIG. 3 wherein like components with FIG. 2 have been given the same reference numerals. The bracket 14 in the alternative embodiment does not include a windshield channel and the flange member 22 extends from a proximal end of a leg rearwardly away from the base. In either case, the u-shaped channel of the mounting strip is press-fit onto an outer edge of the flange member to attach an enclosure panel to the golf cart. This provides for a fast and easy installation of an enclosure. Likewise, removal of the enclosure is simple and fast.

Figure 4:
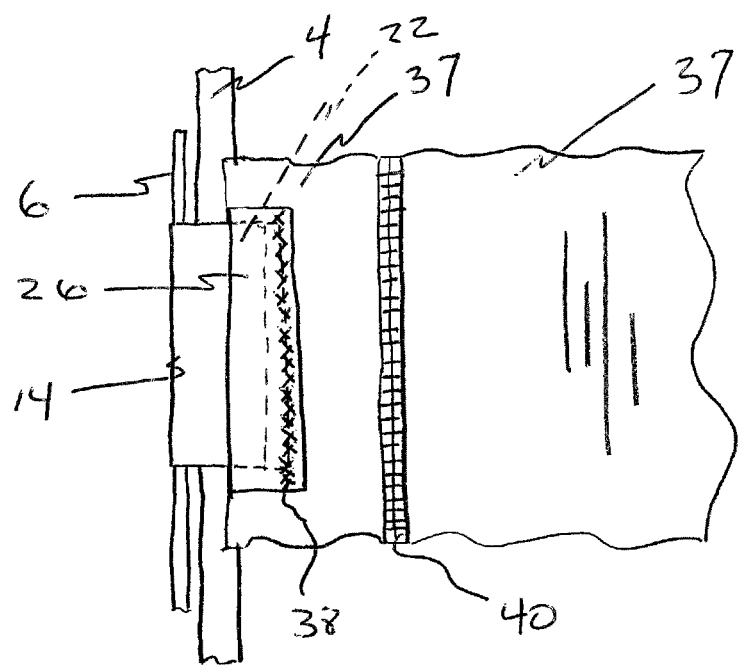
FIG. 4 is a side view of a golf cart enclosure panel secured to a flange member in accordance with the present invention.

Referring to FIG. 4, a side view of a golf cart enclosure panel attached to a flange member in accordance with the present invention is shown. As discussed previously, the bracket 14 is press-fit onto a roof support member 4. In this embodiment, the bracket 14 includes a channel for holding the windshield 6. The bracket 14 includes a flange member 22 extending outwardly from a leg of the bracket. A mounting strip 26 is press-fit onto the edge of the flange member. The mounting strip is affixed via stitching 38 or other suitable attachment means to an enclosure panel 37. Accordingly, by attaching the mounting strip 26 onto the flange member 22, the enclosure panel 37 is mounted onto the golf cart. As shown in FIG. 4, the enclosure may comprise a plurality of panels 37 connected together, e.g., by means of a zipper 40 or other attachment means such as Velcro or snaps.

Figure 6:
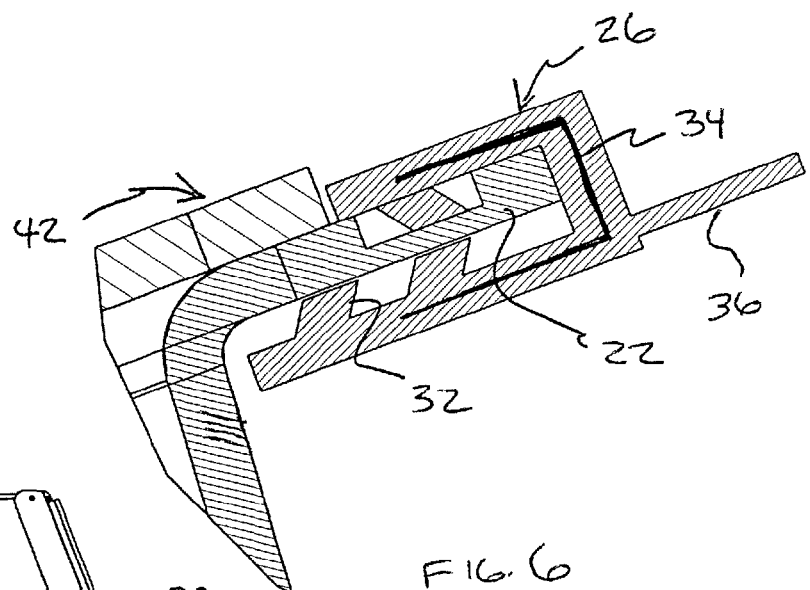
FIG. 6 is a cross-sectional view taken along lines E-E of FIG. 5 illustrating the flange member and mounting strip attached thereto.
Figure 5:
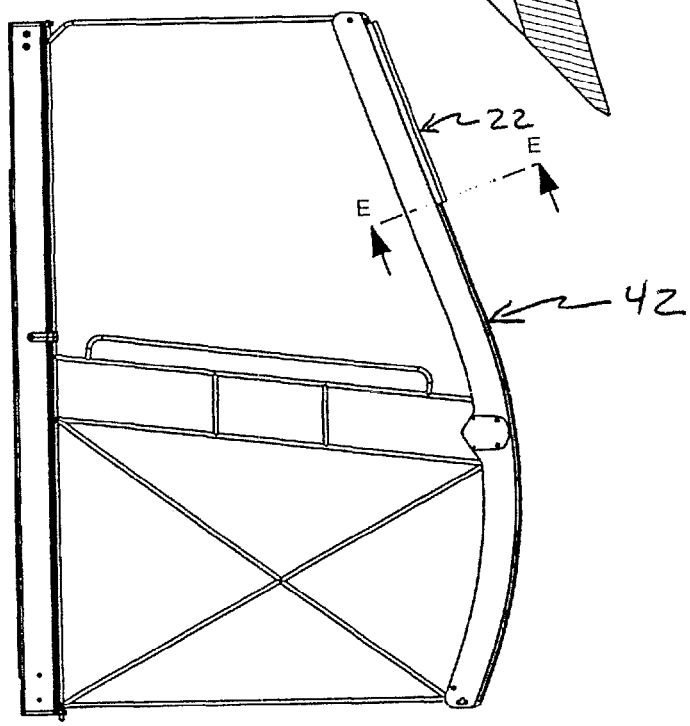
FIG. 5 is a side view of a door frame for a golf cart enclosure including a flange member in accordance with the present invention.

An alternative embodiment of the present invention shown in FIGS. 5-6 relates to providing a flange member on an enclosure frame. Specifically, the flange member 22 may be provided on an enclosure having doors to enclose the sides of the golf cart. The doors are hinged to open and close in a manner similar to an automobile door. This framed enclosure provides a rigid frame on which the enclosure panels are mounted. As shown in FIG. 5, a door frame 42 is made from, e.g., a framework of metal. The door frame 42 is adapted to be covered by fabric and transparent materials to allow the occupants to see out of the golf cart. By way of example, the lower portion of the door frame may be covered in an opaque fabric while the upper half of the door frame is covered by a transparent, window-like material. A flange member 22 may be mounted directly onto the door frame 42 as shown in FIG. 5.

FIG. 6 is a detailed view of the flange member 22 mounted on the door frame 42 as shown in FIG. 5 and further illustrating the mounting strip 26 mounted onto the flange member 22. Similar to FIG. 2, the flange member includes a retention member 24 in the form of a slot. The mounting strip 26 also includes retention members 32 in the form of angled fingers or projections, one of which engages the slot in the flange member to provide a firm, secure attachment of the mounting strip 26 to the flange member 22. The mounting strip 26 includes a tab portion 36 to which an enclosure panel may be secured. As shown in FIG. 6, the mounting strip also includes a shape retention member 34 as discussed previously with respect to FIG. 3. It will be appreciated by those skilled in the art that the flange member 22 may be provided on any rigid frame to be attached to the golf cart to support the enclosure.

The present invention is also directed to a method for mounting a golf cart enclosure to a golf cart. The method includes providing an outwardly extending flange member on a golf cart, providing a golf cart enclosure panel, attaching the enclosure panel to a tab portion of a mounting strip, the mounting strip including a body portion having a u-shaped channel, and press-fitting the u-shaped channel of the mounting strip onto the outer edge of the flange member thereby attaching the enclosure panel to the golf cart. The method further includes the flange member being a part of a bracket which can be mounted to a golf cart, e.g., a bracket adapted to be mounted onto the roof support members in the front of the golf cart. Alternatively, the flange member may be a part of or be a bracket attached to an enclosure frame which is mounted onto the golf cart.

It is to be understood that while preferred embodiments of the invention are illustrated, the invention is not to be limited to the specific form or arrangement of parts herein described and shown. It will be apparent to those skilled in the art that various changes may be made without departing from the scope and spirit of the invention and the invention is not to be considered limited to what is shown and described in the specification and drawings.

What is claimed is:

1. A golf cart enclosure mounting system comprising:
   an elongate flange member extending from a golf cart; and
   a mounting strip having a tab portion attached to a golf cart enclosure panel, the mounting strip further including a u-shaped channel dimensioned to be press-fit onto an outer edge of the elongate flange member.

2. A golf cart enclosure mounting system as defined in claim 1, wherein the elongate flange member comprises a bracket mounted to the golf cart.

3. A golf cart enclosure mounting system as defined in claim 2, wherein the bracket comprises a bracket having a u-shaped opening defined by a base and two legs extending from said base, the u-shaped bracket being dimensioned to be mounted on a golf cart roof support.

4. A golf cart enclosure mounting system as defined in claim 3, wherein the flange member extends from one of the base and legs.

5. A golf cart enclosure mounting system as defined in claim 4, wherein the flange member extends from a distal end of the leg in a direction away from the bracket base.

6. A golf cart enclosure mounting system as defined in claim 4, wherein the flange member extends from a proximal end of the leg in a direction rearwardly beyond the bracket base.

7. A golf cart enclosure mounting system as defined in claim 1, wherein the flange member includes mounting strip retention members thereon.

8. A golf cart enclosure mounting system as defined in claim 7, wherein the mounting strip retention members on the flange member comprises one of grooves, ridges, fingers, tabs, projections and slots.

9. A golf cart enclosure mounting system as defined in claim 1, wherein the flange member comprises a portion of a rigid frame forming a part of the enclosure.

10. A golf cart enclosure mounting system as defined in claim 9, wherein the rigid frame comprises a door frame.

11. A golf cart enclosure mounting system as defined in claim 3, wherein the bracket further includes a windshield receiving channel, the windshield receiving channel being perpendicular to the u-shaped bracket opening.

12. A golf cart enclosure mounting system as defined in claim 1, wherein the mounting strip includes at least one gripping finger extending into the u-shaped channel.

13. A golf cart enclosure mounting system as defined in claim 1, wherein the mounting strip includes a shape-retention member.

14. A golf cart enclosure mounting system as defined in claim 12, wherein the shape-retention member is substantially u-shaped and is embedded into a body of the mounting strip.

15. A golf cart enclosure mounting system as defined in claim 1, wherein the golf cart enclosure panel is sewn to the mounting strip tab portion.

16. A golf cart enclosure mounting system as defined in claim 1, wherein the flange member comprises a portion of a rigid frame member which supports the enclosure.

17. A golf cart enclosure mounting system as defined in claim 2, wherein the bracket is made from extruded plastic.

18. A method for mounting a golf cart enclosure to a golf cart comprising:
   providing an elongate flange member extending from the golf cart;
   providing a golf cart enclosure panel;
   attaching a tab portion of a mounting strip to the enclosure panel, the mounting strip including a u-shaped channel;
   press-fitting the u-shaped channel of the mounting strip onto an outer edge of the flange member thereby attaching the enclosure panel to the golf cart.

19. The method for mounting a golf cart enclosure to a golf cart as defined in claim 18, wherein the flange member comprises a bracket mounted to the golf cart and the flange member extends from the bracket.

20. The method for mounting a golf cart enclosure to a golf cart as defined in claim 18, wherein the flange member comprises a bracket mounted to an enclosure frame, the enclosure frame being mounted onto the golf cart.

* * * * *